(12) United States Patent
Vaniterson

(10) Patent No.: US 7,093,890 B2
(45) Date of Patent: Aug. 22, 2006

(54) COWL GRILLE STRUCTURE WITH INTEGRAL WASHER FLUID CHANNEL

(75) Inventor: John Vaniterson, Belmont, MI (US)

(73) Assignee: Adac Plastics, Inc., Grand Rapids, MI (US)

( * ) Notice: Subject to any disclaimer, the term of this patent is extended or adjusted under 35 U.S.C. 154(b) by 31 days.

(21) Appl. No.: 10/646,577

(22) Filed: Aug. 21, 2003

(65) Prior Publication Data

US 2005/0040674 A1    Feb. 24, 2005

(51) Int. Cl.
*B60S 1/02* (2006.01)
*B60S 1/50* (2006.01)
*B60S 1/52* (2006.01)
*B62D 25/08* (2006.01)

(52) U.S. Cl. ............... 296/192; 296/208; 15/250.1; 239/284.1

(58) Field of Classification Search ........... 296/192, 296/208; 15/250.01; 239/284.1
See application file for complete search history.

(56) References Cited

U.S. PATENT DOCUMENTS

| | | | |
|---|---|---|---|
| 3,300,143 A * | 1/1967 | Lawson .................. 239/284.1 |
| 3,366,336 A * | 1/1968 | Neuschwanger et al. ... 239/129 |
| 3,414,317 A * | 12/1968 | Mortimer .................. 296/192 |
| 3,793,671 A * | 2/1974 | Gebhard .................. 15/250.01 |
| 4,157,161 A * | 6/1979 | Bauer .......................... 239/11 |
| 4,531,255 A * | 7/1985 | Yagasaki et al. ......... 15/250.01 |
| 4,618,096 A * | 10/1986 | Kondo et al. ............... 239/101 |
| 4,637,297 A * | 1/1987 | Anneken ...................... 454/146 |
| 4,645,126 A * | 2/1987 | Bray, Jr. ........................ 239/11 |
| 4,893,865 A * | 1/1990 | McClain et al. ............ 296/192 |
| 5,203,602 A * | 4/1993 | Eustache .................. 296/96.15 |
| 5,403,060 A * | 4/1995 | Durand et al. ................ 296/93 |
| 5,533,779 A | 7/1996 | Epple et al. |
| 5,553,912 A | 9/1996 | Kubina et al. |
| 5,561,882 A * | 10/1996 | Eustache et al. ........ 15/250.001 |
| 5,820,026 A * | 10/1998 | Raghu ...................... 239/284.1 |
| 5,946,763 A * | 9/1999 | Egner-Walter et al. ... 15/250.02 |
| 5,965,950 A * | 10/1999 | Park .......................... 307/10.1 |
| 6,113,006 A * | 9/2000 | Walker et al. ............ 239/284.1 |
| 6,213,541 B1 * | 4/2001 | Razgunas et al. ........... 296/192 |
| 6,224,143 B1 * | 5/2001 | Koulchar et al. ............ 296/192 |
| 6,450,421 B1 * | 9/2002 | Burt .......................... 239/284.1 |
| 6,520,424 B1 * | 2/2003 | Lesser et al. ............ 239/284.1 |
| 6,554,210 B1 * | 4/2003 | Holt et al. ................ 239/284.2 |
| 6,623,688 B1 * | 9/2003 | Gedritis et al. ............. 264/513 |
| 6,682,131 B1 * | 1/2004 | Hayashi ...................... 296/192 |

\* cited by examiner

*Primary Examiner*—D. Glenn Dayoan
*Assistant Examiner*—G Blankenship
(74) *Attorney, Agent, or Firm*—Young & Basile, P.C.

(57) ABSTRACT

A cowl grille structure for positioning in a space between a lower edge of a motor vehicle windshield and a rear edge of a motor vehicle hood. In one embodiment the cowl grille structure includes a molded main body planar leaf screen portion, a washer fluid channel extending along the main body portion and molded integrally with the main body portion, and mounting structure molded integrally with the main body portion for receiving a windshield washer nozzle member with the nozzle member in fluid communication with the integral channel whereby windshield washer fluid may be delivered to the nozzle member through the integral channel. In a second embodiment the washer fluid channel is defined by a molding positioned along the rear edge of the main body leaf screen portion between the rear edge of the main body portion and the lower edge of the windshield.

6 Claims, 4 Drawing Sheets

COWL GRILLE STRUCTURE WITH INTEGRAL WASHER FLUID CHANNEL

BACKGROUND OF THE INVENTION

This invention relates to cowl grilles for motor vehicles and more particularly to a motor vehicle cowl grille with provision to facilitate the delivery of washer fluid to a vehicle windshield.

Motor vehicles typically include one or more windshield washer nozzles positioned forwardly of the windshield and arranged to direct washer fluid against the windshield to facilitate cleaning of the windshield. The washer nozzles are mounted in a rear area of the vehicle hood or in the cowl grille positioned between the forward lower edge on the windshield and the rear edge of the vehicle hood. In either arrangement, washer fluid is directed from a pump/washer unit positioned under the vehicle hood to the nozzles by lengthy and convoluted flexible hosing. While this arrangement is generally satisfactory, it does have certain disadvantages. Specifically, the lengthy hoses required are costly, both from a materials and installation labor standpoint, adding to the overall cost of cowl grille/windshield washer assembly; either during original manufacture or during vehicle usage, the hoses dangling down from the cowl grille may become entangled with the vehicle hood or other components in the tightly packed engine compartment; and the hoses may become disengaged from the spray nozzles or the bottle/pump unit during usage with consequent entanglement in under hood components.

SUMMARY OF THE INVENTION

This invention is directed to an improved cowl grille/windshield washer assembly.

More specifically, this invention is directed to a cowl grille/windshield washer assembly which is simple, inexpensive, and reliable in construction and operation.

The cowl panel structure of the invention is of the type intended for positioning in a space between a lower front edge of a motor vehicle windshield and a rear edge of a motor vehicle hood with the cowl grille extending laterally across the vehicle. According to the invention, the cowl grille structure includes a molded main body planar leaf screen portion, a washer fluid channel extending along the main body portion, and mounting structure molded integrally with the main body portion for receiving a windshield washer nozzle structure with the nozzle structure in fluid communication with the channel. With this arrangement, the windshield washer fluid may be delivered to the washer nozzle through the channel.

According to a further feature of the invention, the cowl grille structure is formed integrally with the main body planar leaf screen portion in a gas assisted molding step. This specific molding methodology allows the formation of an integral channel across substantially the entire lateral extent of the cowl panel.

According to a further feature of the invention, the channel comprises an elongated channel extending laterally along the main body portion and the mounting structure comprises nozzle housing structures formed on an upper face of the main body portion at laterally spaced locations and each defining a cavity in fluid communication with the integral channel. This arrangement facilitates the delivery of washer fluid through the integral channel and into the nozzle housing structures for delivery through the nozzles to the vehicle windshield.

According to a further feature of the invention, the cowl grille further includes integral connector passages extending rearwardly from the integral channel and interconnecting the channel and the cavities in the respective housing structures. This specific passage construction facilitates the delivery of washer fluid to the washer nozzles.

The invention also provides a method of forming a cowl grille structure for positioning between a lower front edge of a motor vehicle windshield and a rear edge of the motor vehicle hood. According to the invention methodology, a main body planar leaf screen portion is molded; a washer fluid channel is formed extending along the main body portion; and a mounting structure is integrally molded on the main body portion for receiving a windshield washer nozzle member with the nozzle member in fluid communication with the integral channel whereby windshield washer fluid may be delivered to the washer nozzle member through the integral channel in the main body portion.

According to a further feature of the invention methodology, the channel is formed integrally with the main body portion utilizing a gas assisted molding step.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
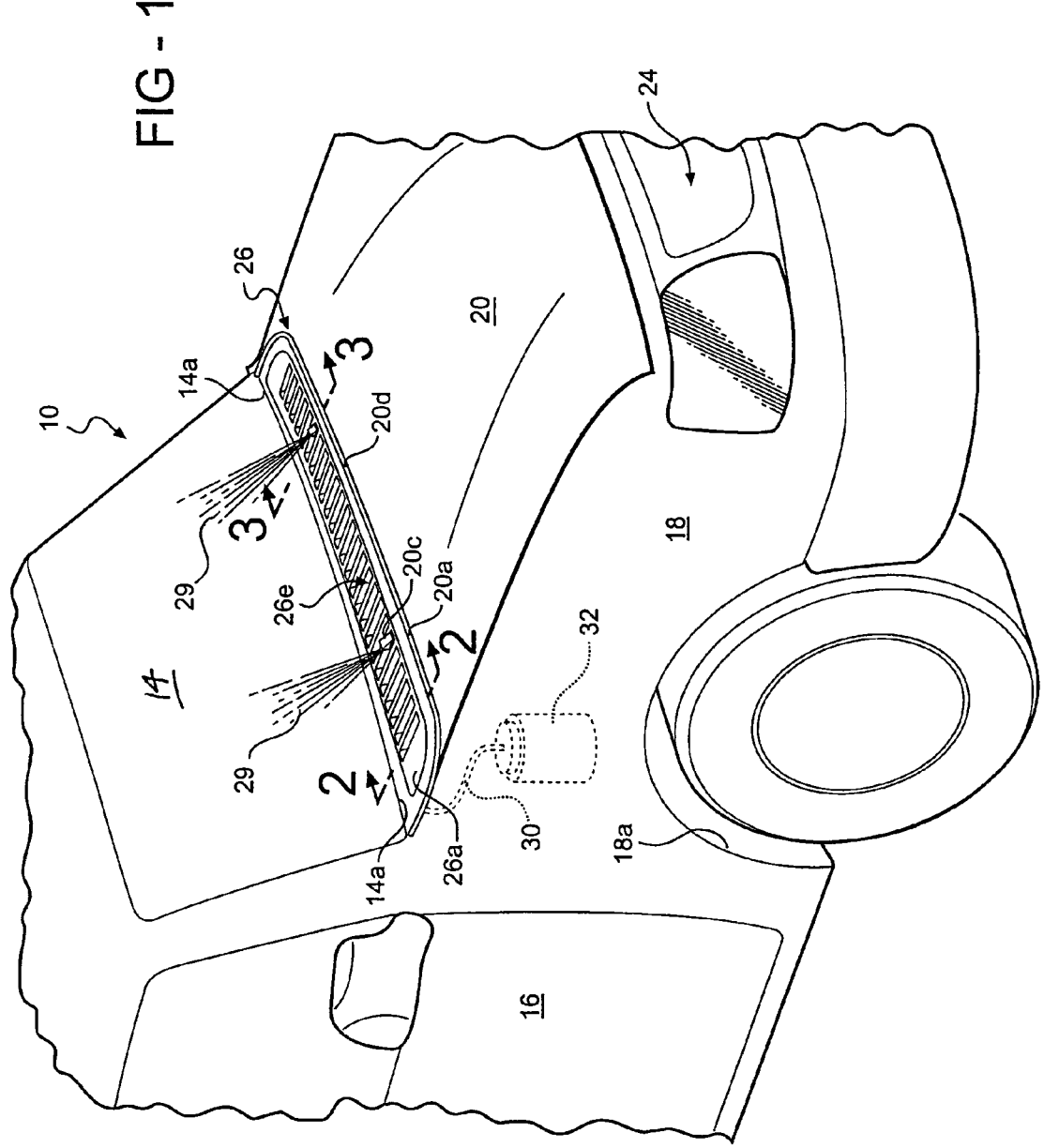
FIG. 1 is a fragmentary somewhat schematic view of a motor vehicle embodying the invention cowl grille structure.
Figure 2:
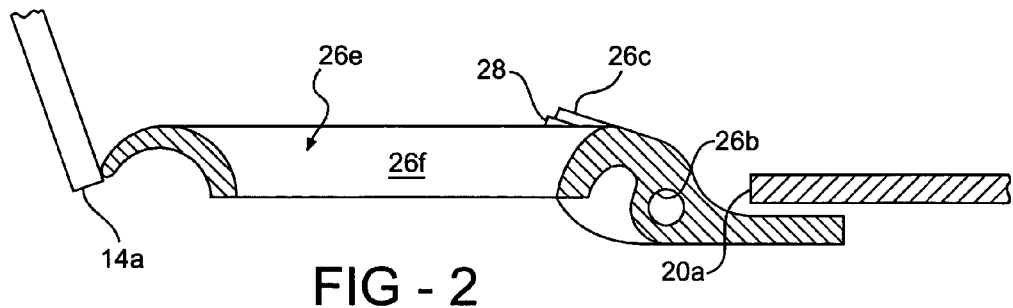
FIG. 2 is a cross sectional view taken on line 2—2 of FIG. 1.
Figure 3:
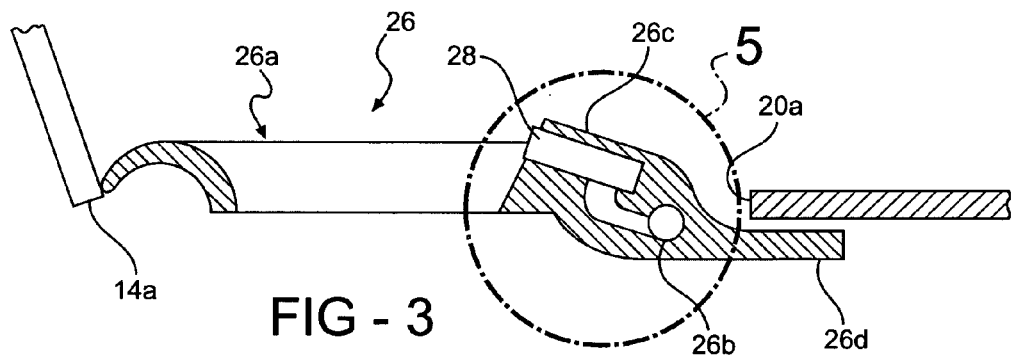
FIG. 3 is a cross sectional view taken on line 3—3 of FIG. 1.

The motor vehicle 10 seen fragmentarily and somewhat schematically in FIG. 1 includes a roof 12, a windshield 14, a right front door 16, a right front quarter panel 18 defining a wheel opening 18a, a hood 20, a front bumper structure 22, a front end clip 24, and a cowl grille structure 26 positioned in a space between a lower edge 14a of the windshield and a rear edge 20a of the motor vehicle hood with the cowl grille extending laterally across the entire width of the vehicle.

Cowl grille structure 26 (FIGS. 1, 2, 3 and 4) is formed in an injection molding operation of a suitable plastics material and includes a main body planar leaf screen portion 26a having a plate configuration, a washer fluid channel 26b extending along the main body portion and molded integrally with the main body portion, and mounting housing structures 26c molded integrally with the main body portion and arranged to receive windshield washer nozzle members 28.

Main body leaf screen portion 26a includes a forward flange portion 26d positioned beneath the rear edge 20a of the closed hood and a plurality of parallel grill openings 26e defined between ribs 26f and functioning in known manner to allow the entry of fresh air into the vehicle for vehicle conditioning purposes.

Channel 26b has a generally circular cross sectional configuration and extends laterally along or across the cowl grille rearwardly of the front flange 26d.

Figure 4:
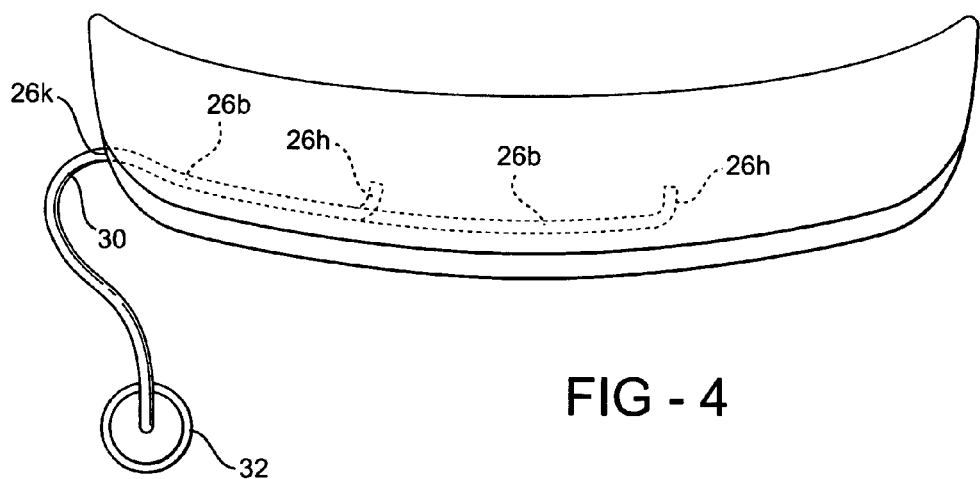
FIG. 4 is a schematic plan view of the invention.

Each mounting housing structure 26c defines a generally rectangular upwardly canted cavity 26g which communicates with channel 26b via an arcuate passageway 26h. As best seen in FIG. 4, passageways 26h interconnect cavities 26g and the channel 26b in a smooth curvilinear configuration so as to facilitate the delivery of washer fluid from the channel 26b to the cavities 26g.

Cowl panel structure 26 is formed in a gas assisted injection molding process. In gas assisted injection molding, the articles are produced by injecting molten resin into the mold cavity and injecting a quantity of pressurized gas into the resin to fill out the mold cavity and form a hollow portion in the resin. The gas is preferably an inert gas such, for example, as nitrogen. A pressure is maintained on the gas in the hollow gas space within the resin until the resin has sufficiently set, whereafter the pressurized gas is released from the molding part hollow space and the molded part is removed from the mold cavity. The gas assisted molding process is especially useful in the present invention since it eliminates the need for a long core extending the entire length of the integral channel 26b.

Figure 5:
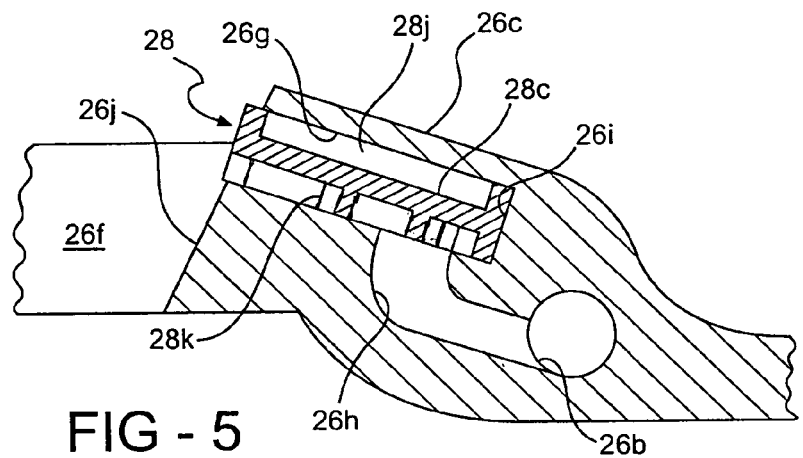
FIG. 5 is a detail view taken within the circle 5 of FIG. 3.
Figure 6:
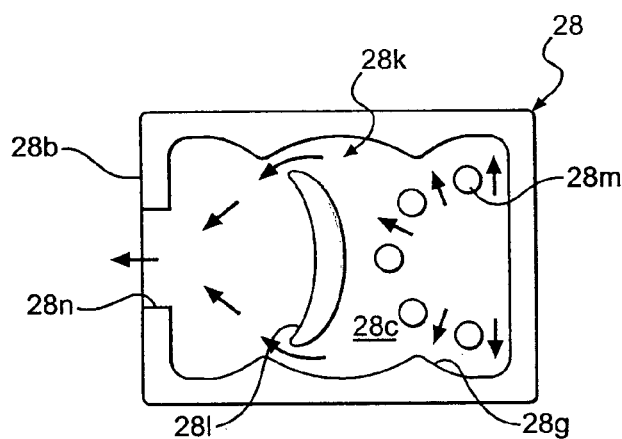
FIG. 6 is an inverted plan view of a nozzle member utilized in the invention.
Figure 7:
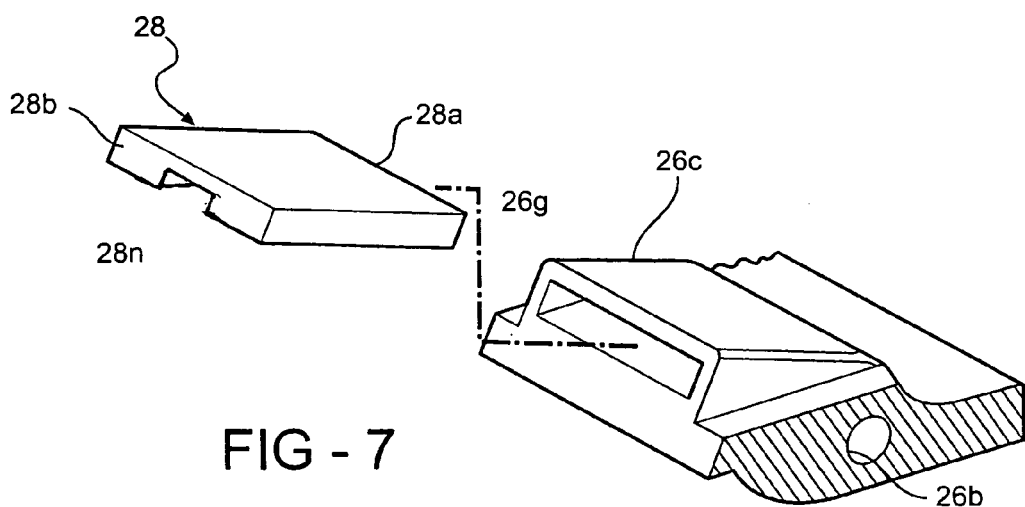
FIG. 7 is a perspective fragmentary view showing the insertion of the nozzle member into a housing structure defined by the cowl grille structure.

Nozzle member 28 (FIGS. 5, 6 and 7) has a rectilinear configuration and is sized to be inserted into cavity 26g with the front end 28a of the nozzle member positioned against the front end 26i of the cavity and the rear end 28b of the nozzle member projecting slightly from the rear face 26j of the housing 26c. Nozzle member 28 includes a central partition 28c which, with the nozzle member inserted into the housing, divides the cavity 26g into an upper cavity chamber 28j and a lower cavity chamber 28k. An arcuate baffle 28l and a semicircular series of pins 28m project downwardly from partition 28c) and a nozzle opening 28n is defined in the front end 28b.

Washer fluid entering fluid chamber 28k through a connector passage 26h is dispersed by pins 28m into a series of separate streams and the separate streams make their way around the ends of baffle 28l and then converge centrally for discharge through the opening 28n from where the stream 29 is directed, in spray form, against the windshield 14. The interior wall 28g of the nozzle member, defining the lower chamber 28k, has a convoluted configuration which coacts with the pins 28m and baffle 28l to impart the desired swirling and spraying behavior to the stream.

A short flexible hose 30 of elastomeric material interconnects the entry end 26k of the integral channel 26b with a water bottle/pump unit 32 positioned beneath the hood of the vehicle in known manner so that, in response to operator actuation of a suitable control device within the passenger compartment of the vehicle, washer fluid may be routed through the hose 30 into the entry end 26k of the integral channel 26b whereafter it may flow laterally through the channel 26b and rearwardly through the curvilinear connector passages 26h for delivery to the nozzle members 28 from whence it may be sprayed onto the windshield in known manner as laterally spaced streams 29 which may coact with the windshield wipers (not shown) in known manner to clean the windshield.

Although the cowl grille has been illustrated as being formed in a single piece extending laterally the entire width of the vehicle, it will be understood that in certain applications the cowl may be formed as a multipart structure with the structures suitably mechanically joined together to form the total cowl grille assembly. In a multipart cowl arrangement the integral channels 26b in the multiple cowl grille members will be understood to align with each other to form a composite integral channel to provide washer fluid to all of the laterally spaced washer nozzles.

Figure 8:
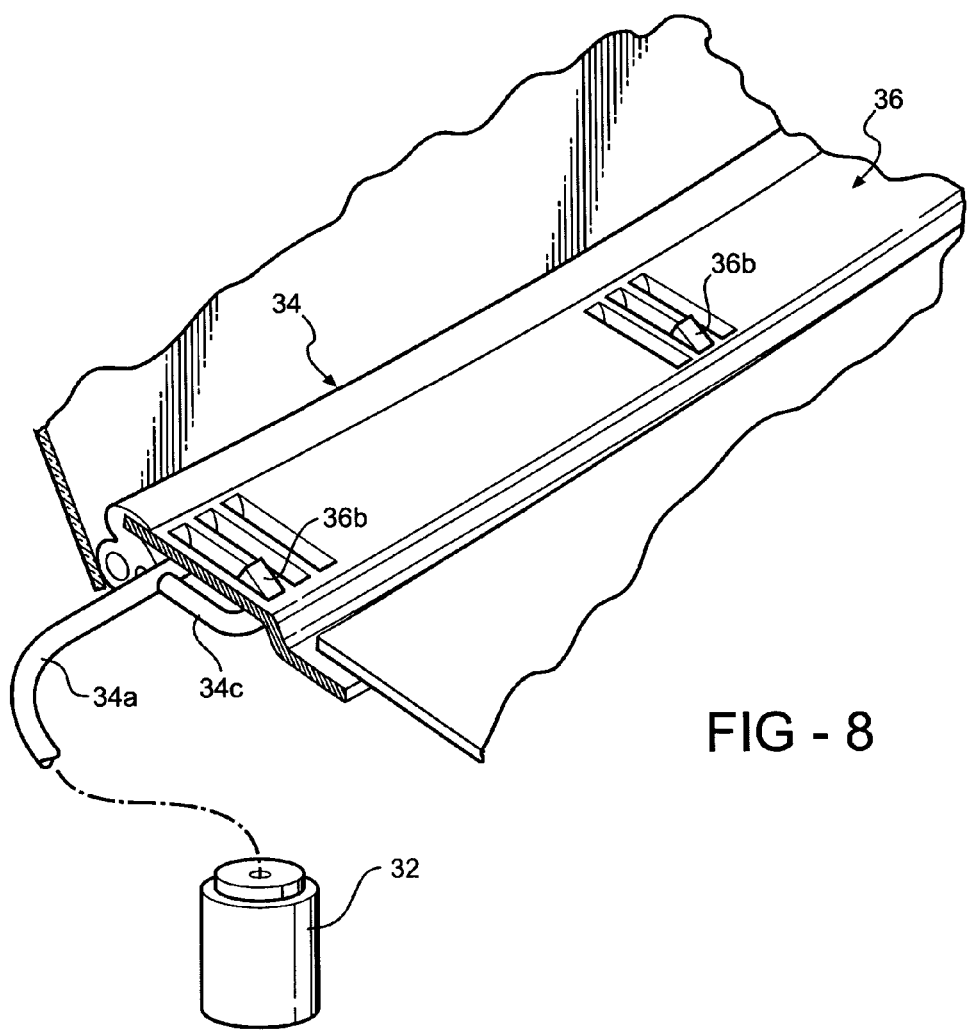
FIG. 8 is a schematic view showing an alternate form of the invention.
Figure 9:
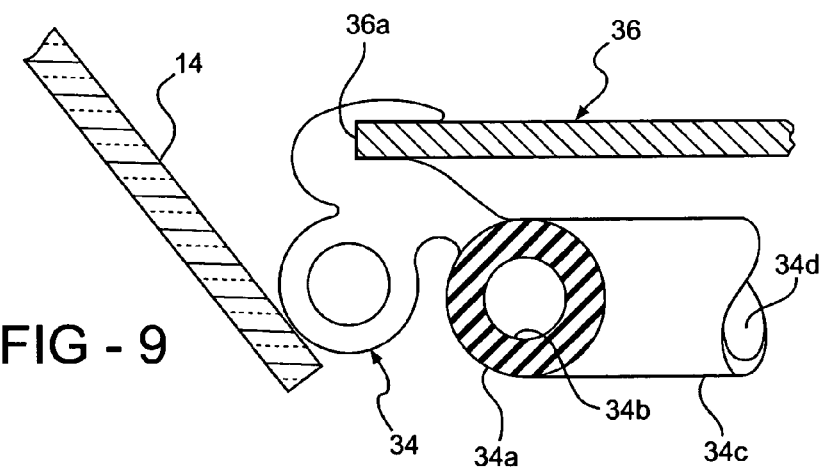
FIG. 9 is a detail view of the alternate invention form seen in FIG. 8.

In the alternate form of the invention seen in FIGS. 8 and 9, a molding or gimp 34 is secured along the rear edge 36a of the cowl grille 36 to seal a space between the rear edge of the cowl grille and the windshield 14, and the gimp is configured to include an auxiliary portion 34a positioned beneath the main body of the cowl grille and defining a laterally extending channel 34b. The gimp further includes connector portions 34c which define channels 34d which connect with the cavities formed in nozzle housing structures 36b corresponding to the nozzle housing structures 26c in the FIGS. 1–7 embodiment.

Auxiliary molding portion 34a may extend to the pump/water bottle 32 located beneath the hood or may connect to a separate hose which in turn would connect with the unit 32. In this embodiment the washer fluid is delivered to the auxiliary molding portion 34a and thence through the connector portions 34c to the nozzle assemblies for delivery to the windshield.

Both disclosed embodiments of the invention have the advantage of utilizing existing cowl grille assembly structure to provide the primary channel for delivery of washer fluid to the washer nozzles rather than relying on separate hoses which add to the cost and complexity of the assembly and introduce the potential for entanglement of the hoses in under hood componentry. Further, the use of a nozzle housing structure molded integrally with the main body leaf screen portion eliminates the need for any separate nozzle structure to define the housing structure to receive the nozzle member.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cowl grille structure for positioning in a longitudinal space between a lower edge of a motor vehicle windshield and a rear edge of a motor vehicle hood with the cowl grille extending laterally across the vehicle, characterized in that:

the cowl grille structure includes a molded main body planar leaf screen plate portion for positioning in the space to define the cowl structure for the vehicle, the planar plate portion defining a series of laterally spaced grille openings to allow the entry of fresh air into the vehicle, the planar plate portion further defining a washer fluid channel extending laterally along a forward edge of the main body plate portion and formed integrally with the main body plate portion, the planar plate portion further defining mounting housing structure molded integrally with the main body plate portion and forming a plurality of laterally spaced, rearwardly opening cavities for receiving a plurality of windshield washer nozzle members with each cavity in fluid communication with the channel whereby windshield washer fluid may be delivered to the nozzle members through the channel.

2. A cowl grille structure according to claim 1 wherein the cowl grill further defines integral connector passages extending rearwardly from the channel and interconnecting the channel and the cavities and their respective housing structures and the cowl grille structure further includes a nozzle member inserted into the cavity in each nozzle housing structure and operative to direct fluid received through the channel and a respective connector passage against the vehicle windshield.

3. A cowl grille structure according to claim 1 wherein the washer fluid channel is formed in a gas assisted molding step.

4. A cowl grille structure according to claim 1 wherein the cowl grille further defines integral connector passages extending rearwardly from the channel and interconnecting the channel and the cavities in the respective nozzle housing structures.

5. A cowl grille structure according to claim 4 wherein the cowl grille structure further includes a nozzle member inserted into the cavity in each nozzle housing structure and operative to direct fluid received through the channel and a respective connector passage against the vehicle windshield.

6. A cowl grille structure for positioning in a longitudinal space between a lower edge of a motor vehicle windshield and a rear edge of a motor vehicle hood with the cowl grille extending laterally across the vehicle, characterized in that:

the cowl grille structure includes a molded main body planar leaf screen plate portion defining a plurality of laterally spaced grille openings to allow the entry of fresh air into the vehicle, a washer fluid channel extending laterally along the main body plate portion, and mounting housing structure molded integrally with the main body plate portion for receiving a windshield washer nozzle member with the nozzle member in fluid communication with the channel whereby windshield washer fluid may be delivered to the nozzle member through the channel;

the channel is defined by a molding secured along a rear edge of the main body portion between the rear edge of the main body portion and the lower edge of the motor vehicle windshield.

* * * * *